(12) United States Patent
Park

(10) Patent No.: US 9,900,388 B2
(45) Date of Patent: Feb. 20, 2018

(54) DATA TRANSMISSION METHOD AND DATA RECEPTION METHOD BETWEEN CONTROLLERS IN VEHICLE NETWORK

(71) Applicant: HYUNDAI MOTOR COMPANY, Seoul (KR)

(72) Inventor: Sung Joon Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 367 days.

(21) Appl. No.: 14/558,662

(22) Filed: Dec. 2, 2014

(65) Prior Publication Data
US 2015/0215125 A1    Jul. 30, 2015

(30) Foreign Application Priority Data
Jan. 29, 2014  (KR) .......................... 10-2014-0010991

(51) Int. Cl.
| | | |
|---|---|---|
| H04L 29/08 | (2006.01) | |
| H04L 29/06 | (2006.01) | |
| G06F 21/85 | (2013.01) | |
| H04L 9/06 | (2006.01) | |

(52) U.S. Cl.
CPC .............. *H04L 67/12* (2013.01); *G06F 21/85* (2013.01); *H04L 9/065* (2013.01); *H04L 63/1466* (2013.01); *G06F 2221/2107* (2013.01); *H04L 2209/84* (2013.01)

(58) Field of Classification Search
CPC ..... H04L 67/12; H04L 9/065; H04L 63/1466; H04L 2209/84; G06F 21/85; G06F 2221/2107
See application file for complete search history.

(56) References Cited

U.S. PATENT DOCUMENTS

| | | | | |
|---|---|---|---|---|
| 5,844,990 | A  * | 12/1998 | Kokubu | ................. B60R 25/04 380/262 |
| 6,982,983 | B2 * | 1/2006 | Ota | ........................ G01C 21/26 340/3.5 |
| 7,712,139 | B2 * | 5/2010 | Westendorf | ............... H04L 1/18 705/51 |
| 8,577,036 | B2 * | 11/2013 | Porsch | .................. H04L 9/3236 380/255 |
| 9,152,805 | B2 * | 10/2015 | Yamashita | ............ G06F 21/606 |
| 9,577,997 | B2 * | 2/2017 | Mabuchi | ................. H04L 67/12 |
| 2001/0042137 | A1 * | 11/2001 | Ota | ........................ G01C 21/26 709/248 |
| 2002/0042878 | A1 * | 4/2002 | Westendorf | ............... H04L 1/18 713/169 |

(Continued)

FOREIGN PATENT DOCUMENTS

KR    10-0387141 B1    8/2003

*Primary Examiner* — Beemnet Dada
*Assistant Examiner* — Stephen Gundry
(74) *Attorney, Agent, or Firm* — McDermott Will & Emery LLP

(57) ABSTRACT

A method for transmitting data between controllers in a vehicle network includes transmitting a first data code including an identification number. A second data code is transmitted including a length value of data codes to be transmitted. Data codes are transmitted by using the length value of the data codes to be transmitted. A random number and a position information value of the data codes to be transmitted are included in last and previously transmitted data codes.

8 Claims, 6 Drawing Sheets

(56) References Cited

U.S. PATENT DOCUMENTS

| | | | |
|---|---|---|---|
| 2004/0042401 A1* | 3/2004 | Itoi | H04L 12/40163 370/235 |
| 2005/0203673 A1* | 9/2005 | El-Hajj | G07C 5/008 701/1 |
| 2007/0091932 A1* | 4/2007 | Hwang | H04L 12/4135 370/475 |
| 2011/0047630 A1* | 2/2011 | Cheng | H04L 9/3234 726/34 |
| 2011/0055564 A1* | 3/2011 | Porsch | H04L 9/3236 713/168 |
| 2012/0036355 A1* | 2/2012 | Jang | H04L 63/0428 713/160 |
| 2012/0051546 A1* | 3/2012 | Tsurumoto | H04L 9/0637 380/270 |
| 2012/0084564 A1* | 4/2012 | Choi | H04L 9/0891 713/168 |
| 2012/0093312 A1* | 4/2012 | Gammel | H04L 9/0631 380/255 |
| 2012/0197487 A1* | 8/2012 | Nakasato | B60C 23/0416 701/33.7 |
| 2012/0243585 A1* | 9/2012 | Matsui | H04J 3/0658 375/219 |
| 2013/0016832 A1* | 1/2013 | Yamashita | G06F 21/606 380/44 |
| 2013/0132730 A1* | 5/2013 | Falk | H04L 9/3236 713/181 |
| 2013/0230173 A1* | 9/2013 | Hori | G08G 1/092 380/281 |
| 2013/0308775 A1* | 11/2013 | Minematsu | H04L 9/0625 380/28 |
| 2013/0318406 A1* | 11/2013 | Washio | G08C 25/00 714/715 |
| 2013/0332736 A1* | 12/2013 | Kawamura | H04L 9/0869 713/171 |
| 2014/0010368 A1* | 1/2014 | Ohhira | H04W 12/08 380/270 |
| 2014/0073254 A1* | 3/2014 | Ichihara | G07C 5/008 455/41.2 |
| 2014/0107863 A1* | 4/2014 | Ishigooka | H04L 1/0009 701/1 |
| 2014/0108896 A1* | 4/2014 | Jung | B60W 50/0205 714/819 |
| 2014/0114497 A1* | 4/2014 | Miyake | H04L 9/32 701/1 |
| 2014/0177651 A1* | 6/2014 | Hartwich | G06F 13/4282 370/475 |
| 2014/0232520 A1* | 8/2014 | Kawamura | G07C 9/00007 340/5.23 |
| 2014/0321354 A1* | 10/2014 | Kim | H04L 49/9005 370/315 |
| 2015/0063569 A1* | 3/2015 | Chen | H04W 12/08 380/270 |
| 2015/0066239 A1* | 3/2015 | Mabuchi | H04L 63/1408 701/1 |
| 2015/0074404 A1* | 3/2015 | Kasper | H04L 63/08 713/170 |
| 2015/0095997 A1* | 4/2015 | Mabuchi | H04L 67/12 726/6 |
| 2015/0117468 A1* | 4/2015 | Shin | H04L 5/0055 370/474 |
| 2015/0149059 A1* | 5/2015 | Choi | B60W 30/146 701/96 |
| 2015/0172298 A1* | 6/2015 | Otsuka | H04L 63/123 726/30 |
| 2015/0172306 A1* | 6/2015 | Kim | H04L 63/1425 726/23 |
| 2015/0180840 A1* | 6/2015 | Jung | H04L 9/0825 713/150 |
| 2015/0358351 A1* | 12/2015 | Otsuka | H04L 12/4625 726/23 |
| 2016/0219413 A1* | 7/2016 | Mabuchi | H04W 4/046 |
| 2016/0236653 A1* | 8/2016 | Katou | B60R 25/248 |
| 2016/0241385 A1* | 8/2016 | Heo | H04W 12/00 |

* cited by examiner

```
CDA (DP, ADP) {
 Case DP==1;
   Change ADP (AA BB CC DD) to DATA (BB AA DD CC);
 Case DP==2;
   Change ADP (AA BB CC DD) to DATA (AA XX BB CC XX DD);
         ⋮
 }
```

| ID | DLC | DATA |
|---|---|---|
| 001 | 08 | 01 01 02 03 04 00 00 00 |

FIG. 9

DATA TRANSMISSION METHOD AND DATA RECEPTION METHOD BETWEEN CONTROLLERS IN VEHICLE NETWORK

CROSS-REFERENCE TO RELATED APPLICATION

This application is based on and claims benefit of priority to Korean Patent Application No. 10-2014-0010991 filed Jan. 29, 2014, the entire contents of which are incorporated herein by reference.

TECHNICAL FIELD

The present inventive concept relates to a network security method. More particularly, the present inventive concept relates to a security method of a communication network in a vehicle.

BACKGROUND

A method for transmitting and receiving signals through the existing wiring scheme has approached the limits of its ability due to an increase in vehicle electrical components. In order to solve this problem, data transmission/reception between controllers in a vehicle using a controller area network (CAN) that is a vehicle communication network as shown in FIG. 8 is currently generalized.

In addition, the controllers use a CAN communication data structure of FIG. 9.

However, in the existing CAN communication, it is likely that a hacker having a malicious intention will arbitrarily access the CAN communication to manipulate data with only a controller area network database (CAN DB).

The hacker having the malicious intention may cause acceleration that a driver does not intend by changing a torque signal of an electrical control unit (ECU) in a vehicle. In addition, the hacker may cause danger for the driver by requesting a motor driven power steering (MDPS) in a vehicle having a smart parking assist system (SPAS) to suddenly change a steering angle.

The degree of the danger gradually increases as the access to the CAN in the vehicle using a device such as a smart phone becomes easy with the development of connection techniques between the smart phone and the vehicle.

Accordingly, it is increasingly required to implement a security solution in a vehicle communication network in order to improve driver's safety.

Conventional methods for overcoming weaknesses of the security are as follows.

First, there is a method for preventing CAN IDs of other communications except diagnosis communication from accessing controllers by filtering only CAN addresses with a diagnosis router provided in the middle of a CAN communication line and transmitting the filtered CAN addresses to the controllers. However, in this method, there is a problem in that if a direct access to a major line of the CAN communication or a controller line is performed, data may be changed.

In addition, there is a method for performing encryption or decryption by installing an encryption module at a communication terminal of each controller or encrypting communication data and performing isolation of the controller by installing a security module (e.g., a gateway or the like) on a communication network. However, in this method, there is a problem in that a separate encryption module needs to be installed for each controller, which results in an increase in cost. Also, there is a problem in that, in the method using a separate security module, an arbitrary access to the security module may be performed by hacking only the security module. Also, there is a problem in that the communication in the entire network is impossible when a defect of the security module occurs.

SUMMARY OF THE DISCLOSURE

The present inventive concept provides a data transmission method and a data reception method, which can provide an improved security by adjusting length and position information of data codes in transmission and reception of the data codes between controllers in a vehicle network.

The present inventive concept also provides a data transmission method and a data reception method, in which communication signals including an engine speed, a steering angle and the like, transmitted from controllers in a vehicle, are classified into a separate group, thereby more safely performing data transmission and reception between the controllers.

One aspect of the present inventive concept relates to a method for transmitting data between controllers in a vehicle network, the method including: transmitting a data code including an identification number; transmitting a data code including a length value of data codes to be transmitted; and transmitting data codes by the length value of the data codes to be transmitted, wherein, in the transmitting of the data codes by the length value of the data codes to be transmitted, a random number and a position information value of the data codes to be transmitted are respectively included in the last and previously transmitted data codes.

The length value of the data codes may be determined by substituting the random number into an encryption function, and the position information value of the data codes may be determined by substituting the random number into the encryption function.

The random number may be determined by substituting the length value of the data codes and the position information value of the data codes to be transmitted into the encryption function.

In the transmitting of the data codes by the length value of the data codes to be transmitted, an arbitrary value may be added to a data code except the data codes including information to be used in a controller to receive the data codes, the data code including the random number, and the data code including the position information value of the data codes.

The identification number may be an identification number related to engine control of a vehicle, an identification number related to steering of the vehicle, or an identification number related to braking of the vehicle.

The method may include determining, based on the random number and the position information value of the data codes, whether the received data codes are normal or abnormal. When normal data codes are received after abnormal data codes are received, the reception of the abnormal data codes may be determined as a past error and the normal data code may be received.

Another aspect of the present inventive concept encompasses a method for receiving data between controllers in a vehicle network, the method including: receiving data codes from a controller; extracting a length value of data codes received from a secondly received data code among the received data codes; extracting a position information value of data codes received from a previous data code of the last transmitted data code among the received data codes;

extracting a random number from the last transmitted data code among the received data codes; calculating a length value of the received data codes and a position information value of the received data codes; comparing the calculated length and position information values of the received data with those of the data codes, extracted from the received data code; and converting the arrangement of the received data codes into that of data codes which the controller in the vehicle network recognizes, using the length and position information values of the data codes, extracted from the received data code, when the calculated length and position information values of the received data are equal to those of the data codes, extracted from the received data code, respectively.

In the calculating of the length and position information values of the received data codes, the length and position information values of the received data codes may be calculated by substituting the extracted random number into an encryption function.

In the calculating of the length and position information values of the received data codes, the length and position information values of the received data codes may be calculated by substituting the extracted random number into an inverse encryption function.

In the comparing of the calculated length and position information values of the received data with those of the data codes, extracted from the received data code, the received data codes may be disregarded, and a subsequent process may not be performed, when the calculated length and position information values of the received data are different from those of the data codes, extracted from the received data code, respectively.

The method may further include generating an error code and transmitting the error code to other controllers, when the case where the calculated length and position information values of the received data are different from those of the data codes, extracted from the received data code, respectively, is generated for a predetermined time or more.

An identification number related to engine control of a vehicle, an identification number related to steering of the vehicle, or an identification number related to braking of the vehicle may be included in the firstly received data code among the received data codes.

The method may include determining, based on the calculated length and position information values and the extracted length and position information values, whether the received data codes are normal or abnormal. When normal data codes are received after abnormal data codes are received, the reception of the abnormal data codes may be determined as a past error and the normal data code may be received.

Still another aspect of the present inventive concept relates to a method for receiving data between controllers in a vehicle network, the method including: receiving data codes from a controller; extracting a length value of data codes received from a secondly received data code among the received data codes; extracting a position information value of data codes received from a previous data code of the last transmitted data code among the received data codes; extracting a random number by substituting the length value of the received data codes into an encryption function; calculating a length value of the received data codes and a position information value of the received data codes; comparing the calculated length and position information values of the received data with those of the data codes, extracted from the received data code; and converting the arrangement of the received data codes into that of data codes which the controller in the vehicle network recognizes, using the length and position information values of the data codes, extracted from the received data code, when the calculated length and position information values of the received data are equal to those of the data codes, extracted from the received data code, respectively.

In the extracting of the random number by substituting the length value of the received data codes into an encryption function, the random number may be extracted by substituting length values of data codes received for a predetermined time into the encryption function in the received sequence.

The method may include determining, based on the calculated length and position information values and the extracted length and position information values, whether the received data codes are normal or abnormal. When normal data codes are received after abnormal data codes are received, the reception of the abnormal data codes may be determined as a past error and the normal data code may be received.

Other aspects of the inventive concept are discussed infra.

As described above, the data transmission method and the data reception method between the controllers in the vehicle network according to the present inventive concept have advantages as follows.

First, the structure of data codes can be changed by substituting a random number into the encryption function, so that it is possible to prevent communication data used between the controllers in the vehicle network from being changed using external equipment, thereby reinforcing the security in the vehicle network.

Second, only the data (communication signals) of a controller, that may bring danger to the driver when data directly related to driving of the vehicle is maliciously manipulated, are classified as a separate group, and are encrypted, so that it is possible to minimize a load taken for the controller to encrypt data. Thus, it is possible to prevent a communication delay or the like due to the decryption.

Third, only the length and position information of transmission data codes are changed, so that it is unnecessary to use a high-specification micro controller unit (MCU) for calculating a complicated code algorithm. Thus, it is possible to reduce cost in the design of a vehicle network.

Fourth, each controller individually performs encryption and decryption in a data transmission/reception process, so that even when a malicious user attacks any one controller, it is possible to prevent the security of the entire network from collapsing.

Fifth, the length of data codes can be easily adjusted, so that a change in data rate is easy. Thus, the data rate to be applied to CAN communication in the near future can be easily applied.

The above and other features of the inventive concept are discussed infra.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept.

Figure 9:
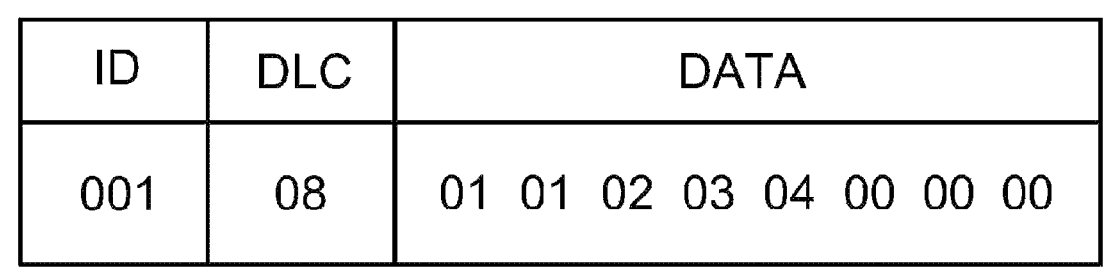

FIG. 9 is a diagram illustrating a data structure used in the CAN communication network.

Figure 1:
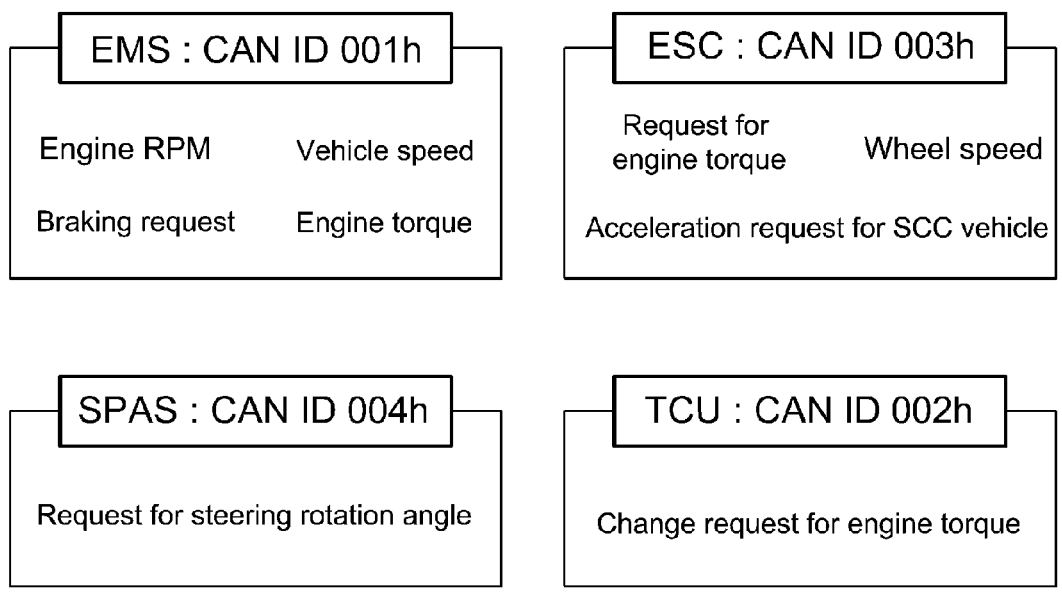
FIG. 1 is a diagram illustrating a state in which various types of communication signals in controllers, which may bring danger to a driver during driving of a vehicle, are classified.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

FIG. 1 is a diagram illustrating a state in which various types of communication signals in controllers, which may bring danger to a driver during driving of a vehicle, are classified.

In an embodiment of the present inventive concept, communication signals of controllers, which may bring danger to a driver when the communication signals related to driving of a vehicle among communication signals between many controllers included in a vehicle network are arbitrarily manipulated, are classified as a separate group, thereby protecting transmission and reception of data codes between the controllers.

To this end, in a data transmission method and a data reception method between controllers in a vehicle network according to an embodiment of the present inventive concept, signals that may bring danger to driving of a vehicle among communication signals of the controllers are classified as a separate group and encoded as data. Then, an identification (ID) provided to the data.

For example, data signals of controllers for controlling engine RPM, vehicle speed, braking request and engine torque may be classified as a group including communication signals of controllers related to an engine management system (EMS), and '001h' (h indicates a hex code) may be provided as a CAN ID to only data that may bring danger to driving of the vehicle among CAN communication data of the controllers included in the group. Data signals for controlling request for steering rotation angle may be related to a smart parking assist system (SPAS), and '004h' may be provided as a CAN ID. In addition, data that may bring danger to driving of the vehicle among CAN communication data of a telecommunication control unit (TCU) that is a controller for taking charge of a change request for the engine torque may be grouped, and '002h' may then be provided as a CAN ID to the grouped data. Further, data signals for controlling request for engine torque, wheel speed, and acceleration request may be classified as a group including communication signals related to an electronic stability control (ESC) system, and '003h' may be provided as a CAN ID.

However, the present inventive concept is not necessarily limited thereto. That is, communication signals of a controller for controlling the engine of the vehicle or steering the vehicle, which may bring serious influence on the driver when the communication signals are illegally manipulated during driving of the vehicle may be grouped, and a specific ID may then be provided to the grouped communication signals. Accordingly, only specific signals transmitted from a controller can be encrypted as compared with when all signals transmitted from the controller are encrypted, thereby enhancing efficiency.

In the data transmission method and the data reception method according to an embodiment of the present inventive concept, length and position information values of data codes in the grouped controller or between groups are actively adjusted, thereby preventing the data codes from being arbitrarily manipulated.

In the data transmission method and the data reception method according to an embodiment of the present inventive concept, the term 'data code' refers to each CAN message transmitted and received between controllers in a CAN network. Specifically, the data code may refer to an 8-bit (1-byte) data signal that represents each CAN ID or data frame. However, the present inventive concept is not limited thereto. That is, the data code may be freely designed not to be limited to an 8-bit or 12-bit data signal as long as it is a signal capable of representing each CAN ID or data frame.

Figure 2:
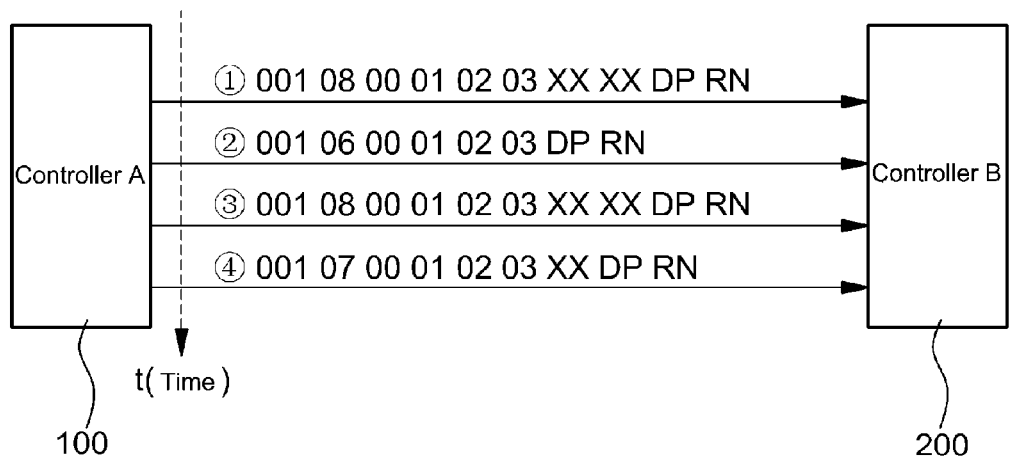
FIG. 2 is a diagram illustrating an example in which the length of data codes is actively changed in a data transmission method between controllers in a vehicle network according to an embodiment of the present inventive concept.
Figure 3:
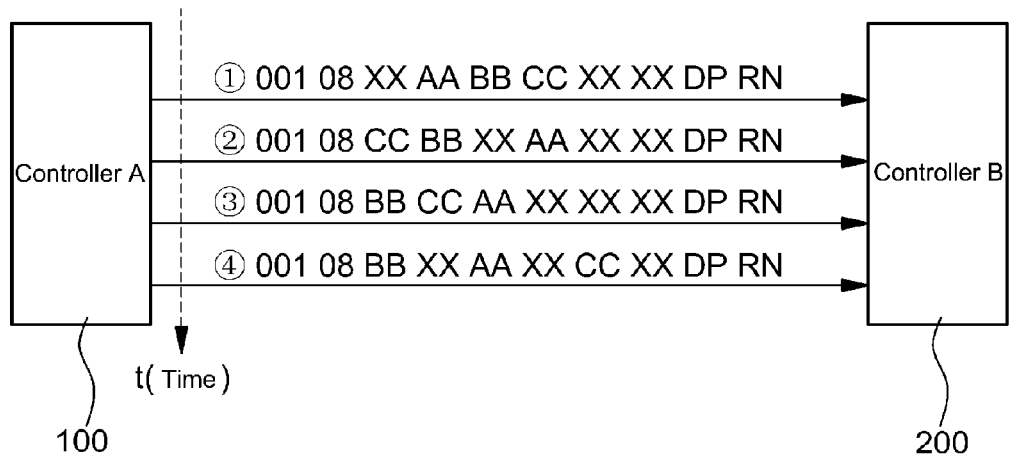
FIG. 3 is a diagram illustrating an example in which only the position information of data codes is changed in the data transmission method between the controllers in the vehicle network according to an embodiment of the present inventive concept.
Figures 4, 5:
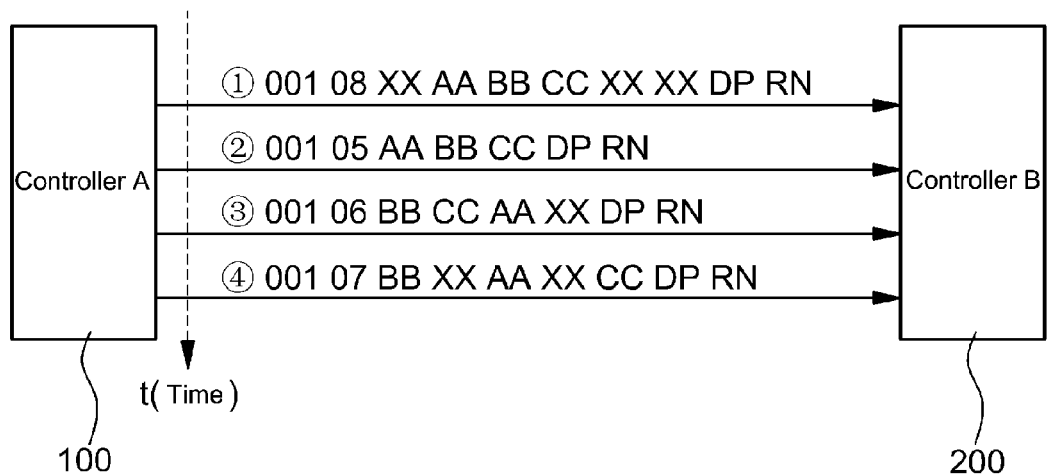
FIG. 4 is a diagram illustrating an example in which the length and position information of data codes are simultaneously changed in the data transmission method between the controllers in the vehicle network according to an embodiment of the present inventive concept.
FIG. 5 is a diagram illustrating an example of a method for changing the position information of data codes in a controller transmitting the data codes according to an embodiment of the present inventive concept.

FIGS. 2 to 4 are diagrams illustrating a data transmission method between controllers in a vehicle network according to an embodiment of the present inventive concept.

FIG. 2 is a diagram showing an example in which the length of data codes is actively changed in the data transmission method between the controllers in the vehicle network according to an embodiment of the present inventive concept.

In a data transmission process between a controller A 100 and a controller B 200, the length of data codes transmitted from the controller A 100 may be variously changed.

First, the controller A 100 may transmit a data code including an identification number. If the identification number is an identification number corresponding to the controller B 200, the controller B 200 may receive and decrypt data codes to be transmitted in a subsequent process. However, if the identification number is not the identification number corresponding to the controller B 200, the controller B 200 may disregard the data codes to be transmitted. In FIG. 2, the identification number of a data code that the controller B 200 desires to receive may be '001'.

After the data code including the identification number is transmitted, the controller A 100 may transmit a data code including information on a length value of the data codes to be transmitted.

If the length value of the data codes is '08', eight data codes will be transmitted in a subsequent process. If the length value of the data codes is '06', six data codes will be transmitted in the subsequent process.

Subsequently, data codes in which significant values to be substantially used in a controller to receive the data codes are recorded may be transmitted to the controller B 200. In FIG. 2, portions represented as '00', '01', '02' and '03' may be data codes in which significant information to be used in the controller B 200 is recorded.

After the significant data codes are transmitted, if the length of data codes to be transmitted from the controller A 100 is longer than the length of significant data codes to be substantially transmitted from the controller A 100, the other values (other than those of the significant data codes) may be filled with arbitrary values. The arbitrary values may be values that are not used in the controller B 200, and therefore, may be referred to as garbage values.

When the position of the data codes is changed after the data codes including the significant data codes and the garbage values are transmitted, a data code including a position information value for notifying information on the changed position may be transmitted.

Finally, a random number (RN) used to actively adjusting the length of the data codes may be transmitted. In FIG. 2, the length of the data codes may be continuously changed through a value arbitrarily determined by substituting the RN into an encryption function.

FIG. 3 is a diagram showing an example in which only the position information of data codes is changed in the data transmission method between the controllers in the vehicle network according to an embodiment of the present inventive concept.

First, the controller A 100 may transmit a data code including an identification number.

After the data code including the identification number is transmitted, a data code including a length value of data codes may be transmitted. In FIG. 3, the value stored in each second data code is commonly '08', and hence eight data codes will be transmitted to the controller B 200 in a subsequent process.

After the data code including the length value of the data codes is transmitted, the controller A 100 may transmit the data codes.

The data codes may include a portion in which values of significant data codes to be substantially used in the controller B 200 are recorded, a portion including arbitrary values, a position information value of the data codes, and an RN.

Among the data codes to be transmitted from the controller A 100 to the controller 200, an arbitrary value used to adjust the length value of the data codes may be added to a portion except the portions including the significant data codes, the position information value and the RN.

FIG. 4 is a diagram showing an example in which the length and position information of data codes are simultaneously changed in the data transmission method between the controllers in the vehicle network according to an embodiment of the present inventive concept.

First, a data code including an identification number may be transmitted from the controller A 100 to the controller B 200. Similarly to FIGS. 2 and 3, the identification number of the controller B 200 may be '001'.

After the data code including the identification number is transmitted, the controller A 100 may transmit a data code including a length value of the data codes. If the length value of the data codes is '08', eight data codes may be transmitted in a subsequent process. If the length value of the data codes is '05', five data codes may be transmitted in the subsequent process.

In each data code to be transmitted as described above, an arbitrary value may be included in a portion except a portion in which significant data codes to be substantially used in the controller B 200 are recorded and a portion in which a position information value of the data codes to be transmitted and an RN are recorded.

The position information and length values of the data codes may be arbitrarily determined by substituting the RN into the encryption function.

In the data transmission method and the data reception method between the controllers in the vehicle network according to an embodiment of the present inventive concept, as described in FIGS. 2 to 4, length and position information values of data codes may be arbitrarily adjusted using an RN, so that it is possible to prevent the values from being maliciously manipulated.

In FIGS. 2 to 4, the method of determining the length of data codes and the position information of significant data codes may be performed by substituting an RN into the encryption function.

As an example, it may be expected that the controller A 100 and the controller B 200 will use an encryption function in common.

The controller A 100 may determine length and position information values of data codes to be transmitted by substituting an RN into the encryption function. The length and position information values of the data codes may be stored as variables, e.g., 'DLC1' and 'DP1', respectively.

The controller A 100 may transmit a data code including the 'DLC1', 'DP1' and the RN to the controller B 200.

The controller B 200 receiving the data code may have the same encryption function. Hence, the controller B 200 may extract the RN from the received data code and substitute the extracted RN into the encryption function.

The length and position information values of the data codes, extracted by substituting the RN into the encryption function may be referred to as, e.g., 'DLC2' and 'DP2', respectively.

Since the controller B 200 has the same encryption function, the length and position information values of the data codes, extracted by substituting the RN into the encryption function, may be equal to the length and position information values of the data codes received from the controller A 100. That is, 'DLC1' may be equal to 'DLC2', and 'DP1' may be equal to 'DP2'. If these values are not equal to each other, the controller B 200 may determine that data have been manipulated.

As another example, it may be expected that the controller A 100 may have an encryption function and the controller B 200 may have an inverse encryption function, e.g., decryption function. Therefore, the controller B 200 may decrypt a data code, using the inverse encryption function, and identify whether the data code is abnormal, e.g., it has been maliciously manipulated.

The controller A 100 may determine length and position information values DLC1 and DP1 of data codes to be transmitted, and extract an RN by substituting the length and position information values DLC1 and DP1 into the encryption function.

The controller B 200 receiving the data codes may extract an RN from the received data codes and substitute the RN into the inverse encryption function. In addition, the controller B 200 may extract length and position information values of the data codes by substituting the RN into the inverse encryption function. The length and position information values of the data codes may be referred to as 'DLC2' and 'DLP2', respectively.

Here, the controller B 200 can determined that 'DLC1' and 'DLP1' have been equal to 'DLC2' and 'DLP2', respectively, and that the data codes transmitted from the controller A have not been manipulated. However, if these values are not equal to each other, it may be determined that the values of the data codes transmitted from the controller A are values which are manipulated or damaged in the transmission process. Therefore, the controller B 200 may disregard the received data codes.

Thus, the operation of the controller B 200 can be guaranteed by receiving only data codes correctly transmitted from the control A 100. Accordingly, it is possible to prevent the vehicle from being placed in a non-control state due to an arbitrary or maliciously change in engine torque or steering angle of the vehicle.

FIG. 5 is a diagram illustrating an example of a method for changing the position information of data codes in a controller transmitting the data codes.

A function of changing position information of data codes may be referred to as a 'CDA' function. In order to change the position information of the data codes, the 'CDA' function may receive a position information value of data codes and a value of data codes to be substantially transmitted from the controller A 100 to the controller B 200. The position information value of the data codes may be referred to as 'DP', and the data code to be transmitted from the controller A 100 may be referred to as 'ADP'.

In addition, 'DP' may be 'DP1' or the like which is a position information value extracted by substituting an RN into the encryption function as described above. Since the position information value extracted by substituting the RN into the encryption function is determined as an arbitrary value, 'DP' may be a value that generally represents any value that 'DP1' may have. In addition, 'ADP' may represent an arrangement order of data codes substantially used in the controller of the vehicle. In a case where the vehicle network is configured with a CAN network, 'ADP' may represent arrangement information of data codes used in the CAN network.

If 'DP' and 'ADP' are inputted to the 'CDA' function, the 'CDA' function may switch to each 'Case' statement to change the position information of 'ADP' depending on 'DP' (see FIG. 5).

In FIG. 5, it can be seen that when 'DP' is 1, for example, the data code recorded as 'AA BB CC DD' may be changed into the data code recorded as 'BB AA DD CC'.

Figure 6:
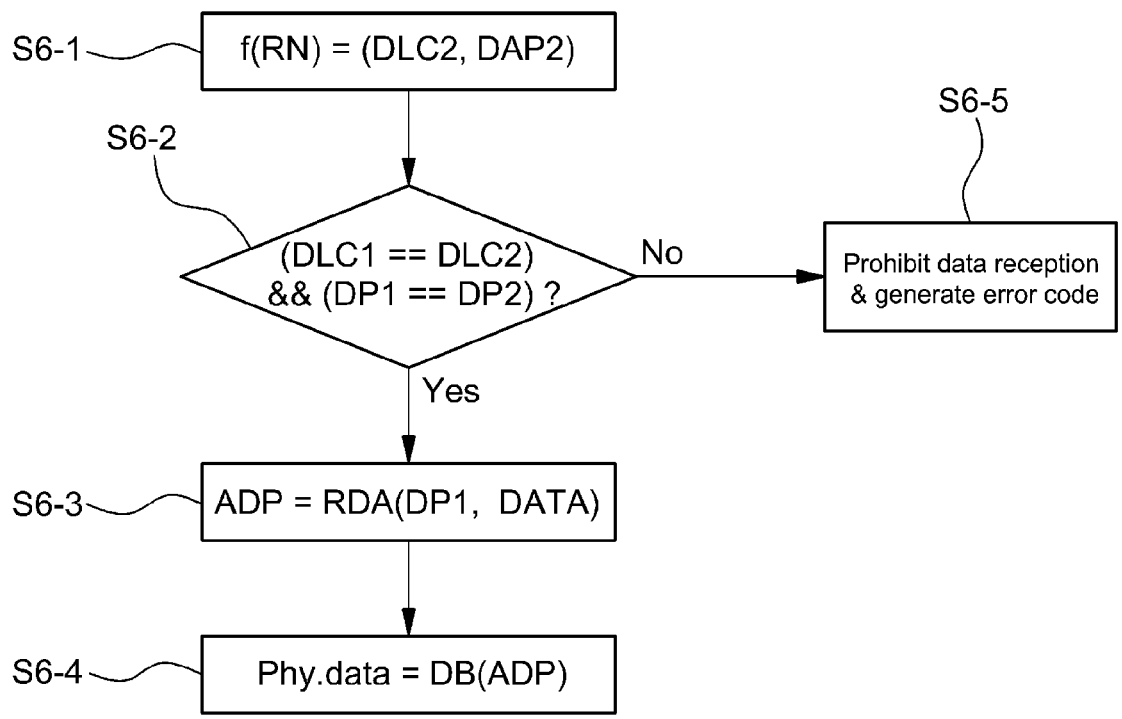
FIG. 6 is a flowchart illustrating a method of identifying whether a received data code is a correct data code in a data reception method between the controllers in the vehicle network according to an embodiment of the present inventive concept.

FIG. 6 is a flowchart illustrating a method of identifying whether a received data code is a correct data code in a data reception method between the controllers in the vehicle network according to an embodiment of the present inventive concept.

In order to identify or determine whether a data code received to a controller is abnormal, the controller receiving the data code may calculate length and position information values of data codes by substituting an RN into an encryption function (S6-1).

Next, the controller receiving the data codes may compare the length and position information values DLC2 and DP2 calculated by substituting the RN into the encryption function with those DLC1 and DP1 of the received data code (S6-2).

In step S6-2, if the length and position information values DLC2 and DP2 calculated by substituting the RN into the encryption function are equal to those DLC1 and DP1 of the received data code, respectively, the controller receiving the data code may convert the arrangement of the received data code into an arrangement of data codes which the controller can understand or recognize (S6-3). That is, when the network of the vehicle applied to the data transmission method and the data reception method according to the present inventive concept is a network using CAN communication, the controller may convert the arrangement of the received data code into an arrangement of data codes which the controller can understand or recognize in the CAN communication. An 'RDA' function is a function that is used to convert a data code DATA received using the position information value DP1 of the data codes extracted from the received data code into a data code ADP which the controller can understand or recognize. The 'RDA' function may be an inverse function of the 'CDA' function shown in FIG. 5.

The controller may convert the converted data codes into a physical value to be substantially used in the controller (S6-4). In step S6-4, a 'DB' function may be a function that converts 'ADP' which the controller can understand or recognize into a physical value, and 'Phy.data' calculated as described above may be a real physical value that represents a vehicle speed, engine RPM, or the like.

However, if the length and position information values DLC2 and DP2 calculated by substituting the RN into the encryption function are not equal to those DLC1 and DP1 of the received data code, respectively, the controller may decide or determine that the received data is a data code which is arbitrarily or maliciously manipulated or damaged, and perform an operation of prohibiting data reception or an operation of informing each controller or an upper-level controller of an error code (S6-5).

Figure 7:
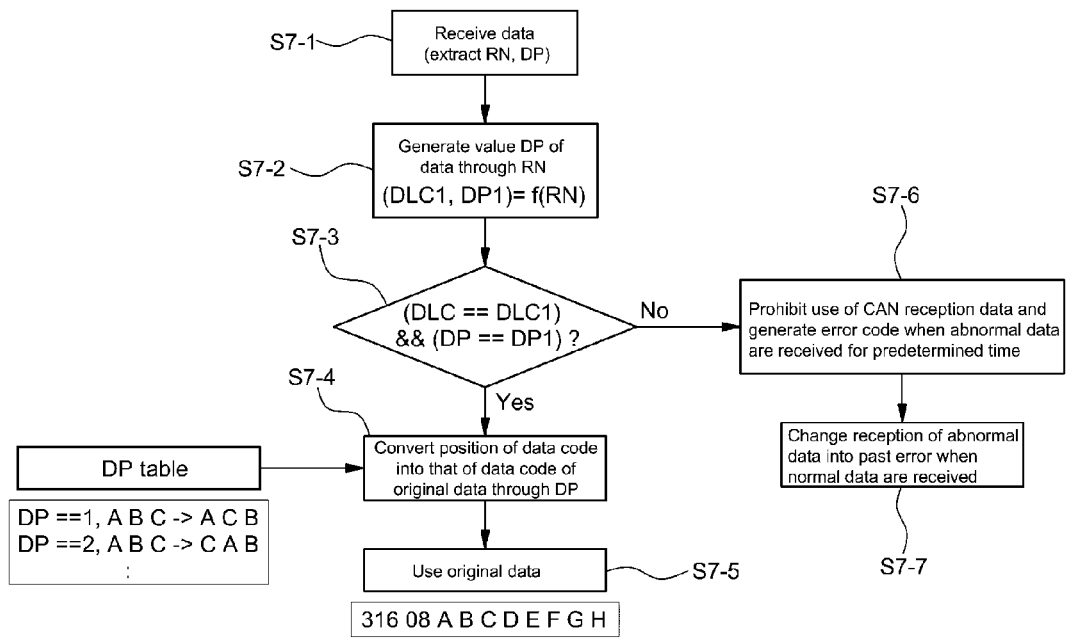
FIG. 7 is a flowchart illustrating in detail the data reception method of FIG. 6.
Figure 8:
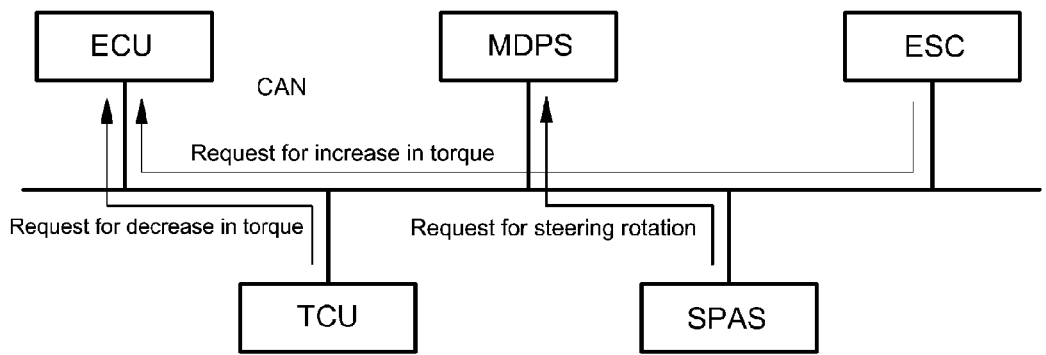
FIG. 8 is a diagram illustrating a controller area network (CAN) communication network.

FIG. 7 is a flowchart illustrating in detail the data reception method of FIG. 6.

The controller receiving the data code may extract, from the data code, an RN and a position information value DP of the data code (S7-1).

The controller may generate length and position information values of data codes by substituting the extracted RN into the encryption function (S7-2).

Subsequently, the controller may compare the length and position information values DLC1 and DP1 of the data codes generated as described above with those DLC and DP of the received data code, and determine whether the length and position information values DLC1 and DP1 of the data codes are equal to those DLC and DP of the received data code, respectively (S7-3).

If the length and position information values DLC1 and DP1 generated by substituting the RN into the encryption function are equal to those DLC and DP of the received data code, respectively, the controller may convert the position of the received data code into a position of data codes of the original data, using the position information value DP calculated from the received data code (S7-4).

However, if the length and position information values DLC1 and DP1 generated by substituting the RN into the encryption function are not equal to those DLC and DP of the received data code, respectively, the controller may not use the received data code (S7-6). In step S7-6, if abnormal data codes of which length and position information values are not equal to those of the data codes generated by substituting the RN into the encryption function and are continuously received, the controller receiving the abnormal data codes may recognize the abnormal data codes as malicious data codes, and generate an error code. The error code may be transmitted to an adjacent controller or another upper-level controller to inform a malicious access to the vehicle network.

If a normal data code is again received after the abnormal data codes are continuously received, the controller may recognize the reception of the abnormal data codes as a past error, and again receive the new (normal) data code (S7-7).

In the step S7-4, the process of converting the received data code into the data codes of the original data through the position information value DP of the received data code may be performed through a data position information value table (DP table) used to adjust the position information of data cods, based on the position information value of the data codes.

The controller using the original data may perform an operation instructed from the data code (S7-5).

As described above, in the data transmission method and the data reception method between the controllers in the vehicle network according to an embodiment of the present inventive concept, signals of controllers, which may have direct influence on driving of the vehicle, may be grouped and then provided with an ID, and the length or position information of data codes of only data provided with the ID may be adjusted, thereby performing transmission/reception of the data codes.

In addition, communication between controllers not directly related to the driving of the vehicle can be performed by transmitting/receiving information using data codes used in the existing vehicle network.

The inventive concept has been described in detail with reference to exemplary embodiments thereof. However, it will be appreciated by those skilled in the art that changes may be made in these embodiments without departing from the principles and spirit of the inventive concept, the scope of which is defined in the appended claims and their equivalents.

What is claimed is:

1. A method for receiving data between controllers in a vehicle network, the method comprising:
receiving, from a controller, data codes including a length value of data codes;
extracting the length value of data codes from the received data codes;
extracting a position information value of the received data codes from a the second to last received data code;
extracting a random number from the last received data codes;
calculating a length value of the received data codes and a position information value of the received data codes;
comparing the calculated length and position information values of the received data codes with the extracted length value and position information value; and
converting an arrangement of the received data codes into an arrangement of data codes which the controller in the vehicle network recognizes, using the extracted length and position information values, when the calculated length and position information values are equal to the extracted length and position information values, respectively,
wherein the calculating of the length and position information values of the received data codes includes calculating the length and position information values of the received data codes by inputting the extracted random number into an encryption function, and
wherein the comparing of the calculated length and position information values of the received data with the extracted length and position information values of the data codes includes disregarding the received data codes and not performing a subsequent process, when the calculated length and position information values of the received data codes are different from the extracted length and position information values of the data codes, respectively.

2. The method of claim 1, wherein, the calculating of the length and position information values of the received data codes includes calculating the length and position information values of the received data codes by inputting the extracted random number into an inverse encryption function.

3. The method of claim 1, further comprising generating an error code and transmitting the error code to other controllers, when the case where the calculated length and position information values of the received data are different from those of the data codes, extracted from the received data code, respectively, remains for a predetermined time or more.

4. The method of any one of claim 1, wherein an identification number related to engine control of a vehicle, an identification number related to steering of the vehicle, or an identification number related to braking of the vehicle is included in the firstly received data code among the received data codes.

5. The method of claim 1, further comprising:
determining, based on the calculated length and position information values and the extracted length and position information values, whether the received data codes are normal or abnormal; and
when normal data codes are received after abnormal data codes are received, determining the reception of the abnormal data codes as a past error and receiving the normal data code.

6. A method for receiving data between controllers in a vehicle network, the method comprising:
receiving, from a controller, data codes including a length value of data codes;
extracting the length value of data codes from the received data codes;
extracting a position information value of the received data codes from the second to last received data code;
extracting a random number by inputting the length value of the received data codes into an encryption function;

calculating a length value of the received data codes and a position information value of the received data codes;

comparing the calculated length and position information values of the received data with the extracted length value and position value; and converting an arrangement of the received data codes into an arrangement of data codes which the controller in the vehicle network recognizes, using the extracted length and position information values of the data codes, when the calculated length and position information values of the received data are equal to the extracted length and position information values, respectively, wherein the comparing of the calculated length and position information values of the received data with the extracted length and position information values of the data codes includes disregarding the received data codes and not performing a subsequent process, when the calculated length and position information values of the received data are different from the extracted length and position information values of the data codes, respectively.

7. The method of claim 6, wherein, the extracting of the random number by inputting the length value of the received data codes into an encryption function includes extracting the random number by inputting length values of data codes received for a predetermined time into the encryption function in a received sequence.

8. The method of claim 6, further comprising:

determining, based on the calculated length and position information values and the extracted length and position information values, whether the received data codes are normal or abnormal; and when normal data codes are received after abnormal data codes are received, determining the reception of the abnormal data codes as a past error and receiving the normal data code.

* * * * *